United States Patent
Ruffini et al.

(10) Patent No.: US 10,575,271 B2
(45) Date of Patent: *Feb. 25, 2020

(54) SYNCHRONISATION OF WIRELESS BASE STATIONS

(71) Applicant: Telefonaktiebolaget LM Ericsson (publ), Stockholm (SE)

(72) Inventors: Stefano Ruffini, Pisa (IT); Stefano Stracca, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,920

(22) Filed: Feb. 21, 2019

(65) Prior Publication Data

US 2019/0191398 A1 Jun. 20, 2019

Related U.S. Application Data

(63) Continuation of application No. 15/742,600, filed as application No. PCT/EP2015/066418 on Jul. 17, 2015, now Pat. No. 10,257,799.

(51) Int. Cl.
*H04W 56/00* (2009.01)
*H04J 3/06* (2006.01)

(52) U.S. Cl.
CPC ......... *H04W 56/002* (2013.01); *H04J 3/0644* (2013.01); *H04J 3/0655* (2013.01); *H04W 56/001* (2013.01); *Y02D 30/32* (2018.01)

(58) Field of Classification Search
CPC ........... H04W 56/001; H04W 56/0015; H04W 56/002; H04W 56/0035; H04W 56/004;
(Continued)

(56) References Cited

U.S. PATENT DOCUMENTS 5,852,630 A 12/1998 Langberg et al.
7,656,897 B2 * 2/2010 Liu .................... H04J 3/1617
370/467

(Continued)

FOREIGN PATENT DOCUMENTS

EP 2663141 A1 11/2013
WO 2015044098 A1 4/2015

(Continued)

OTHER PUBLICATIONS

Bladsjö, D., et al., "Synchronization Aspects in LTE Small Cells", IEEE Communications Magazine, vol. 51, Iss. 9, Sep. 2013, pp. 70-77.

(Continued)

*Primary Examiner* — Siu M Lee
(74) *Attorney, Agent, or Firm* — Murphy, Bilak & Homiller, PLLC

(57) ABSTRACT

A transport network (20) is connected to a first wireless base station (3, 4) and to a second wireless base station (6). The first wireless base station comprises a remote radio unit (3) and a baseband processing unit (4) which are connected by the transport network (20). A node (16) of the transport network (20) receives a synchronous time division multiplexed communication signal which carries at least a first communication signal between the baseband processing unit (4) and the remote radio unit (3). The node (16) determines a frequency synchronisation signal from the synchronous time division multiplexed communication signal. The node (16) transmits the synchronous time division multiplexed communication signal to the remote radio unit (3) of the first wireless base station. The node (16) transmits the frequency synchronisation signal to the second wireless base station (6). The node (16) also assists with providing phase/time synchronisation to the second wireless base station (6).

20 Claims, 13 Drawing Sheets

(58) Field of Classification Search
CPC ............. H04W 56/0055; H04W 56/008; H04J 3/0644; H04J 3/0647; H04J 3/065; H04J 3/0652; H04J 3/0655; H04J 3/0658; H04J 3/0661; H04J 3/0685; H04J 3/0691; H04J 3/0694
USPC .................................. 375/354, 356, 359, 362
See application file for complete search history.

(56) References Cited

U.S. PATENT DOCUMENTS

| | | | | |
|---|---|---|---|---|
| 8,537,948 | B2* | 9/2013 | Przada | ................... H04J 3/0688 375/362 |
| 9,357,515 | B2 | 5/2016 | Feng et al. | |
| 9,525,482 | B1 | 12/2016 | Tse | |
| 9,838,217 | B2 | 12/2017 | Martinotti et al. | |
| 10,257,799 | B2* | 4/2019 | Ruffini | ................ H04W 56/001 |
| 2012/0176980 | A1 | 7/2012 | Moon et al. | |
| 2012/0250738 | A1 | 10/2012 | Shako et al. | |
| 2013/0107808 | A1 | 5/2013 | He et al. | |
| 2013/0195050 | A1 | 8/2013 | Lee et al. | |
| 2013/0294253 | A1* | 11/2013 | Leroudier | ............. H04W 24/00 370/241 |
| 2013/0308532 | A1 | 11/2013 | Yu et al. | |
| 2014/0369243 | A1 | 12/2014 | Guo et al. | |
| 2015/0092793 | A1 | 4/2015 | Aweya | |

FOREIGN PATENT DOCUMENTS

| | | |
|---|---|---|
| WO | 2015113643 A1 | 8/2015 |
| WO | 2016005008 A1 | 1/2016 |
| WO | 2016138950 A1 | 9/2016 |

OTHER PUBLICATIONS

CPRI, "Common Public Radio Interface (CPRI); Interface Specification", CPRI Specification V6.0, Aug. 30, 2013, 1-128.

IEEE , "IEEE Standard for a Precision Clock Synchronization Protocol for Networked Measurement and Control Systems", IEEE Std 1588-2008 (Revision of IEEE Std 1588-2002) IEEE Instrumentation and measurement Society Sponsored by the Technical Committee on Sensor Technology (TC-9) New York, NY, Jul. 24, 2008, 1-289.

* cited by examiner

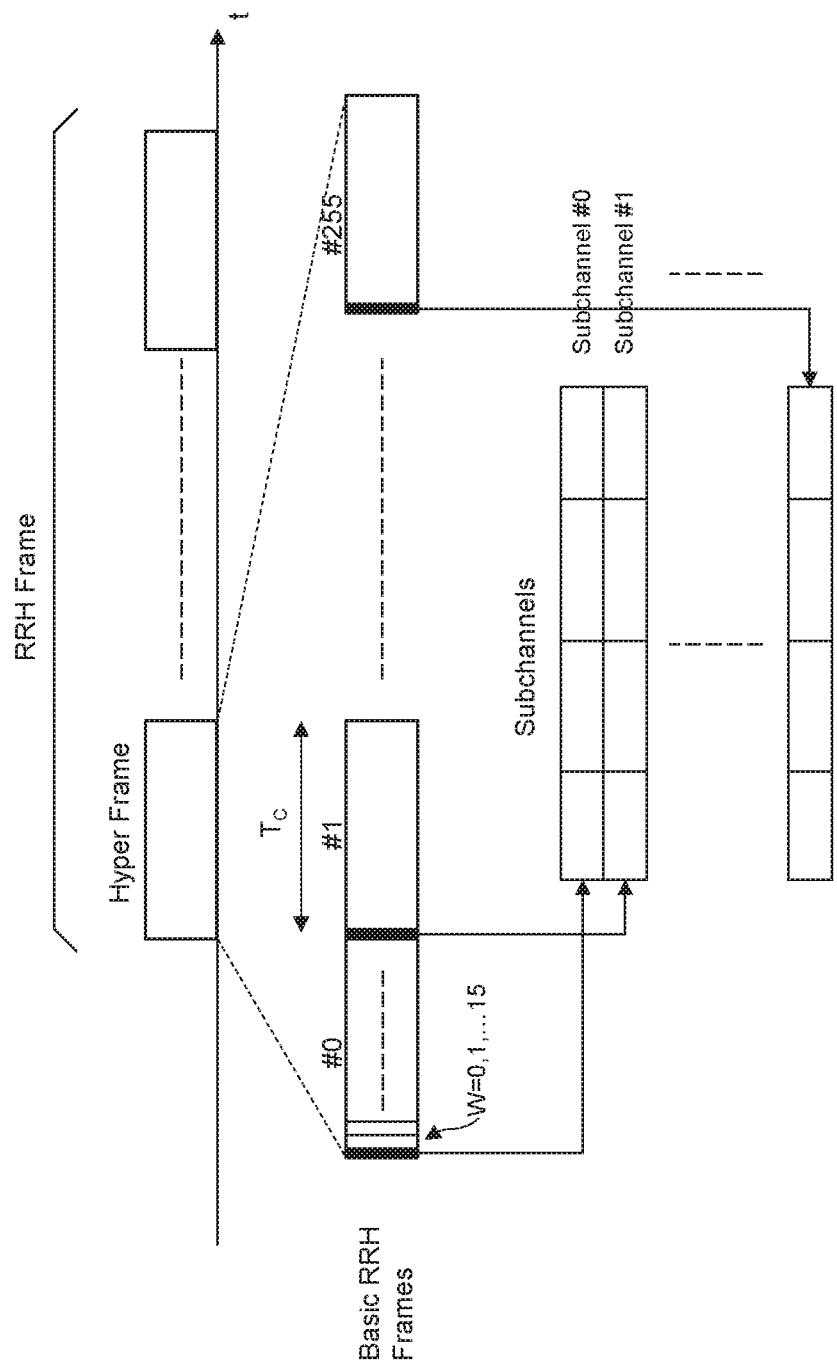

SYNCHRONISATION OF WIRELESS BASE STATIONS

CROSS-REFERENCE TO RELATED APPLICATIONS

This application is a continuation of, and claims the benefit of priority from, U.S. patent application Ser. No. 15/742,600 filed on Jan. 8, 2018, which is a U.S. national-stage application claiming priority to international application PCT/SE2015/066418 filed on Jul. 17, 2015. The entire disclosures of the above-mentioned applications are incorporated herein by reference for all purposes.

TECHNICAL FIELD

The present disclosure is generally related to synchronisation of wireless base stations.

BACKGROUND

In today's wireless networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), and Ultra Mobile Broadband (UMB). A wireless network comprises wireless base stations which provide wireless coverage over a geographical area, typically called a cell.

There is a need to synchronise operation of base stations. Synchronisation allows a base station to generate the correct RF carrier frequency and to time transmission of a wireless signal on the wireless interface. Depending on the type of technology, adjacent cells may operate at the same frequency or at different frequencies. A base station should operate at a required frequency, and should not drift from that frequency. A typical requirement for frequency accuracy is around 50 parts per billion (ppb). When base stations use Time Division Multiplexing (TDM) or Time Division Duplexing (TDD) there is also a requirement for the base stations to have access to an accurate time/phase synchronisation reference, in addition to frequency synchronisation. Time/phase synchronisation is required for the correct generation of the TDD frame on the radio interface to avoid interference between the signals generated by adjacent cells. A typical requirement for time/phase synchronisation is of the order of +/−1.5 µs.

As an example, indoor coverage problems and increasing demand for data in both indoor and outdoor locations are two of the biggest issues related to current mobile network planning, especially with the migration to 4G, due to its higher frequency bands that cause even more path and penetration losses and shorten coverage range. Operators can use small cells (such as micro cells or pico cells) to expand capacity and fill coverage holes in their networks cost-effectively. The evolution of mobile networks is presenting an increased demand to coordinate radio base stations and therefore also requiring the distribution of a phase/time sync reference.

In some base station implementations a radio unit and a baseband processing equipment (also called a digital unit (DU)) are combined. In other implementations, the radio unit and DU are separated and can be split between two different locations. In this case, the radio unit is called a remote radio unit (RRU). The radio unit creates an analog transmit RF signal from the baseband signal and provides the RF signal to an antenna. The radio unit correspondingly digitises an RF receive signal. The DU and RRU are connected via e.g. an optical network. The one or more DUs may be centralised and located remotely, for example a few kilometres from the RRUs. The RRUs are placed close to the radio antennas, e.g. in antenna masts. This minimises feeder and jumper losses between antenna and RRUs, which is often a major challenge to address in most radio transport networks, for example, to enhance the uplink capacity of mobile services. The signal processing is centralised in a DU, which offers processing resources for multiple cells, each covered by an antenna driven by a RRU. This allows a pool of processing resources to be dynamically shared among many cells, in line with the cloud computing principle, saving energy, improving the radio link reliability and decreasing number and size of access sites. A Common Public Radio Interface (CPRI) specifies a Time Division Multiplexing (TDM) protocol for carrying data between DUs and RRUs.

A wireless network may comprise a mix of base station types, such as (i) one or more base stations with a split RRU and DU, and (ii) one or more monolithic base stations with RF and baseband processing at the base station. It is desirable that base stations of different types are synchronised in frequency and/or time.

SUMMARY

An aspect of the disclosure provides a method performed at a first node of a transport network. The transport network is connected to a first wireless base station and to a second wireless base station. The first wireless base station comprises a remote radio unit and a baseband processing unit. The method comprises receiving a synchronous time division multiplexed communication signal which carries at least a first communication signal between the baseband processing unit and the remote radio unit. The method comprises determining a frequency synchronisation signal from the synchronous time division multiplexed communication signal. The method comprises transmitting the synchronous time division multiplexed communication signal to the remote radio unit. The method comprises transmitting the frequency synchronisation signal to the second wireless base station.

An advantage of at least one example is that the first wireless base station and the second wireless base station can be synchronised without the need to implement a separate synchronisation scheme solely for the second wireless base station. This can reduce equipment and signalling carried over a transport network.

An advantage of at least one example is that frequency synchronisation is obtained using an accurate physical layer frequency of a TDM signal (e.g. a CPRI signal) carrying a first communication signal to the first wireless base station.

The method may comprise receiving a second communication signal for the second wireless base station. The frequency synchronisation signal can be transmitted with the second communication signal to the second wireless base station.

The second communication signal may be an Ethernet signal. The method may comprise transmitting the frequency synchronisation signal and the second communication signal to the second wireless base station as a Synchronous Ethernet signal.

The synchronous time division multiplexed communication signal may carry the first communication signal for the remote radio unit and the second communication signal for the second wireless base station. The synchronous time division multiplexed communication signal may be carried on an optical wavelength, and the time synchronisation messages may be carried on the same optical wavelength as the synchronous time division multiplexed communication signal. For example, they can be mapped into different parts of a digital signal carried on the same optical wavelength.

The method may comprise maintaining a first clock at the first node and exchanging synchronisation messages with the second wireless base station for allowing a clock at the second wireless base station to achieve phase synchronisation with the first clock at the first node.

The synchronisation messages may be time synchronisation messages for allowing the clock at the second wireless base station to achieve phase and time synchronisation with the first clock at the first node. The synchronisation messages may be Precision Time Protocol, PTP, messages Maintaining the first clock at the first node may comprise receiving time stamps from a second node of the transport network. The method may comprise determining a delay incurred by the transport network between the second node and the first node. The method may comprise updating the first clock based on the time stamps and the determined delay.

The second wireless base station may have a second clock. The method may comprise carrying synchronisation messages between the second wireless base station and a node which hosts a master clock, wherein the time synchronisation messages are for allowing the wireless base station to synchronise the second clock with the master clock.

The method may comprise compensating for asymmetry between a forward path through the first node and a reverse path through the first node. The forward path and the reverse path are different directions of transmission, e.g. upstream and downstream.

Compensating for asymmetry may comprise compensating within the first node for asymmetry between a forward path through the first node and a reverse path through the first node.

Compensating for asymmetry may comprise inserting a correction value into one of the synchronisation messages between the second wireless base station and the node which hosts the master clock, which synchronisation message passes through the first node.

The synchronisation messages may be Precision Time Protocol, PTP, messages.

The synchronous time division multiplexed communication signal may be a Common Public Radio Interface, CPRI, signal.

The second base station may be an integrated, or monolithic, base station. The second base station may have all of the functionality of the base station combined at one location. For example, the second base station may have a radio (RF) unit and a baseband processing unit co-located at the base station. The term "co-located" means at the same cell site, and include a small physical separation, such as a radio unit located at the top of a tower or building and a baseband processing unit located at the base of the tower or building. The first node of the transport network may transmit/receive a backhaul signal to the second wireless base station.

Another aspect of the disclosure provides a network node for a transport network which is connected to a first wireless base station and to a second wireless base station. The first wireless base station comprises a remote radio unit and a baseband processing unit which are connected by the transport network. The network node is configured to receive a synchronous time division multiplexed communication signal which carries at least a first communication signal between the baseband processing unit and the remote radio unit. The network node is configured to determine a frequency synchronisation signal from the synchronous time division multiplexed communication signal. The network node is configured to transmit the synchronous time division multiplexed communication signal to the remote radio unit of the first wireless base station. The network node is configured to transmit the frequency synchronisation signal to the second wireless base station.

The network node may be configured to perform any of the described or claimed methods.

An advantage of at least one example is that the first wireless base station and the second wireless base station can be synchronised without the need to implement a separate synchronisation scheme solely for the second wireless base station. This can reduce equipment and signalling carried over a transport network.

An advantage of at least one example is that frequency synchronisation is obtained using an accurate physical layer frequency of a TDM signal (e.g. a CPRI signal) carrying a first communication signal to the first wireless base station.

Another aspect of the disclosure provides a network node for a transport network which is connected to a first wireless base station and to a second wireless base station. The first wireless base station comprises a remote radio unit and a baseband processing unit which are connected by the transport network. The network node comprises a processor and a memory. The memory contains instructions executable by the processor. The processor is operative to receive a synchronous time division multiplexed communication signal which carries at least a first communication signal between the baseband processing unit and the remote radio unit of the first wireless base station. The processor is operative to determine a frequency synchronisation signal from the synchronous time division multiplexed communication signal. The processor is operative to transmit the synchronous time division multiplexed communication signal to the remote radio unit of the first wireless base station. The processor is operative to transmit the frequency synchronisation signal to the second wireless base station.

Another aspect of the disclosure provides a network node for a transport network which is connected to a first wireless base station and to a second wireless base station. The first wireless base station comprises a remote radio unit and a baseband processing unit which are connected by the transport network. The network node comprises an input interface configured to receive a synchronous time division multiplexed communication signal which carries at least a first communication signal between the baseband processing unit and the remote radio unit. The network node comprises a first module configured to determine a frequency synchronisation signal from the synchronous time division multiplexed communication signal. The network node comprises a first output interface configured to transmit the synchronous time division multiplexed communication signal to the remote radio unit. The network node comprises a second output interface configured to transmit the frequency synchronisation signal to the second wireless base station.

Another aspect of the disclosure provides a method of operating a wireless system. The wireless system comprises a transport network. The wireless system comprises a first wireless base station. The first wireless base station comprises a remote radio unit and a baseband processing unit which are connected by the transport network. The remote radio unit comprises a clock. The second wireless base station comprises a clock. The method comprises, at the first node, receiving a synchronous time division multiplexed communication signal which carries at least a first communication signal between the baseband processing unit and the remote radio unit of the first wireless base station. The method comprises, at the first node, determining a frequency synchronisation signal from the synchronous time division multiplexed communication signal. The method comprises, at the first node, transmitting the synchronous time division multiplexed communication signal to the remote radio unit of the first wireless base station. The method comprises, at the first node, transmitting the frequency synchronisation signal to the second wireless base station. The method further comprises, at the second wireless base station, using the frequency synchronisation signal to synchronise a frequency of the clock at the second wireless base station with a frequency of the clock at the remote radio unit of the first wireless base station.

An advantage of at least one example is that the first wireless base station and the second wireless base station can be synchronised without the need to implement a separate synchronisation scheme solely for the second wireless base station. This can reduce equipment and signalling carried over a transport network.

An advantage of at least one example is that frequency synchronisation is obtained using an accurate physical layer frequency of a TDM signal (e.g. a CPRI signal) carrying a first communication signal to the first wireless base station.

Another aspect of the disclosure provides a wireless system comprising a transport network, a first wireless base station and a second wireless base station. The first wireless base station comprises a remote radio unit and a baseband processing unit which are connected by the transport network. The second wireless base station comprises a clock. A first node of the transport network is configured to receive a synchronous time division multiplexed communication signal which carries at least a first communication signal between the baseband processing unit and the remote radio unit of the first wireless base station. The first node is configured to determine a frequency synchronisation signal from the synchronous time division multiplexed communication signal. The first node is configured to transmit the synchronous time division multiplexed communication signal to the remote radio unit of the wireless base station. The first node is configured to transmit the frequency synchronisation signal to the second wireless base station. The second wireless base station is configured to use the frequency synchronisation signal to synchronise a frequency of the clock at the second wireless base station with a frequency of the clock at the remote radio unit of the first wireless base station.

An advantage of at least one example is that the first wireless base station and the second wireless base station can be synchronised without the need to implement a separate synchronisation scheme solely for the second wireless base station. This can reduce equipment and signalling carried over a transport network.

An advantage of at least one example is that frequency synchronisation is obtained using an accurate physical layer frequency of a TDM signal (e.g. a CPRI signal) carrying a first communication signal to the first wireless base station.

The phase/time synchronisation messages may be carried by the synchronous frame-based communication signal. For example, the time synchronisation messages may be carried by one of: an overhead portion of the synchronous time division multiplexed communication signal, and a client traffic portion of the synchronous time division multiplexed communication signal.

In examples, there can be a plurality of the first wireless base stations and/or a plurality of the second wireless base stations connected to the same first node. The transport network may comprise a plurality of the first nodes.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

The term "wireless" is used throughout this disclosure to mean communication without wires, and includes "radio".

BRIEF DESCRIPTION OF THE DRAWINGS

Embodiments of the invention will be described, by way of example only, with reference to the accompanying drawings in which:

FIG. 4 shows a format of a CPRI interface;

DETAILED DESCRIPTION

Figure 1:
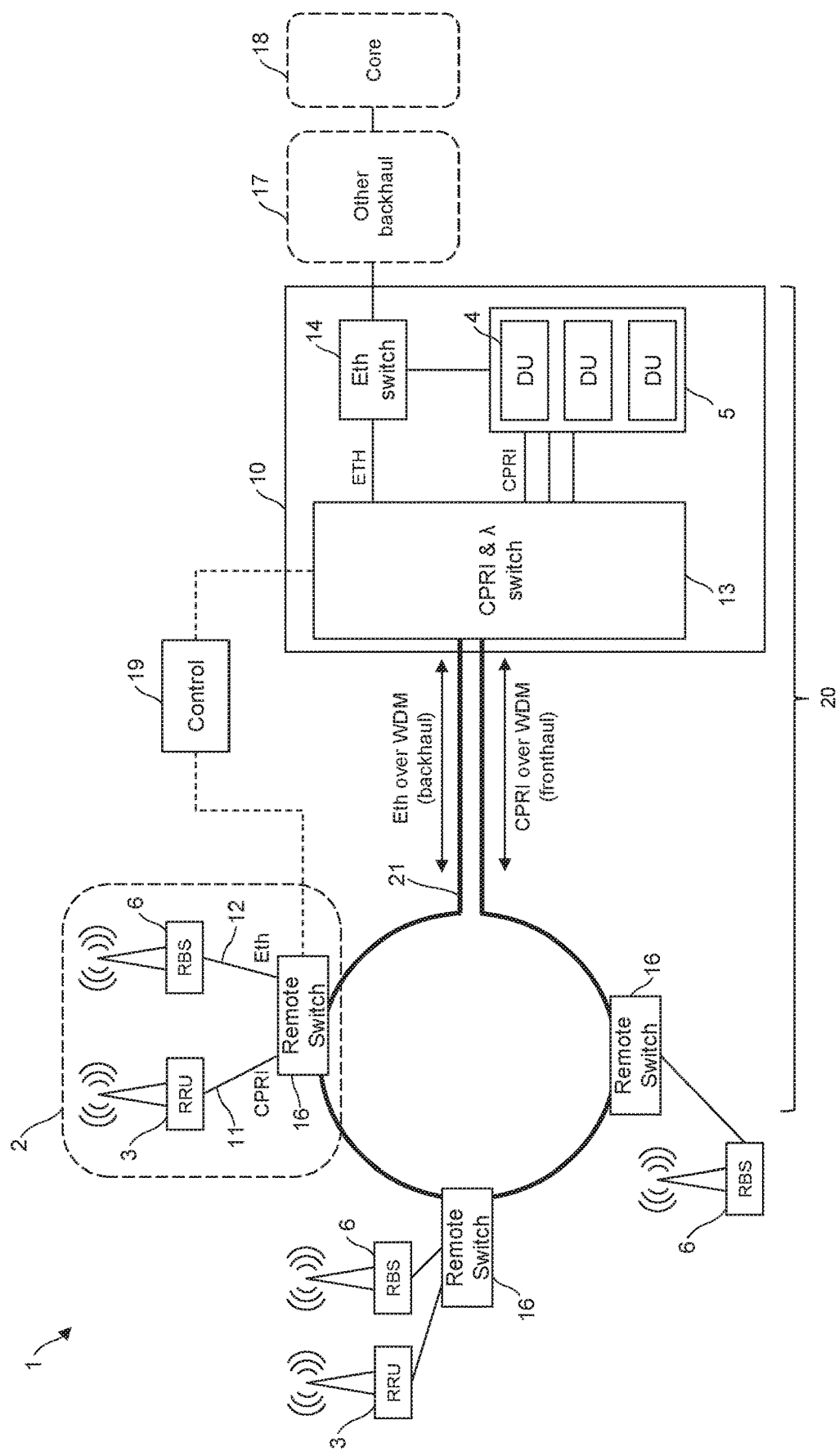
FIG. 1 shows an example network.

FIG. 1 is a schematic overview of a network 1. The network 1 may be considered as a wireless access network, or a part of a wireless access network. The network 1 may be compliant with a number of wireless or radio access technologies, such as one or more of LTE, LTE-Advanced, WCDMA, GSM/EDGE, WiMax, or UMB. Base stations 3, 6 are deployed across an area where wireless coverage is required. There are two types of base station in the network of FIG. 1. The two types of base station are shown in FIG. 2A and FIG. 2B.

Figure 2A:
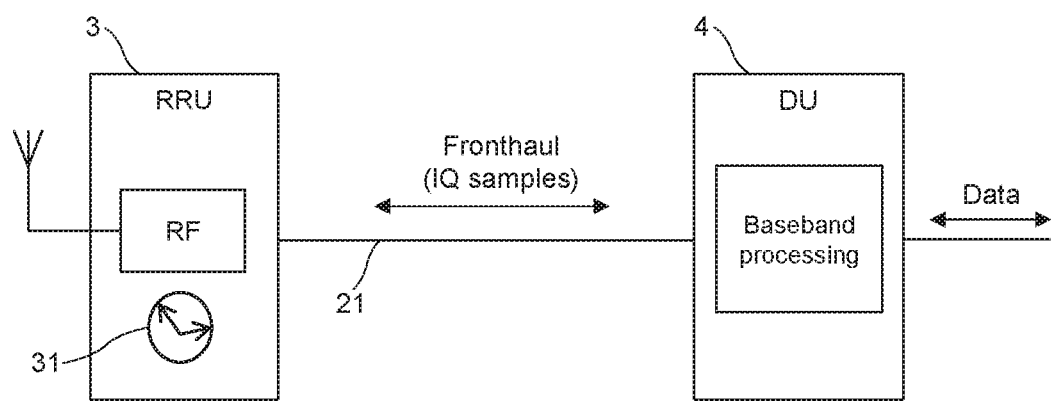
FIGS. 2A and 2B show two types of wireless base station which can be used in the network of FIG. 1.

In the first type of base station, shown in FIG. 2A, the functionality of the base station is split between a remote radio unit (RRU) 3 and a digital unit (DU) 4. The DU 4 is configured to perform processing at baseband and to output digital baseband IQ data. The RRU 3 is configured to transmit an RF signal using the IQ data received from the DU 4. Similarly, the RRU 3 is configured to receive an RF signal and output IQ data of the received signal to the DU 4 for baseband processing. A CPRI interface carries the IQ data. Several IQ data flows are sent via one physical CPRI link. Each IQ data flow reflects the data of one antenna for one carrier, the so-called antenna-carrier (AxC). Each RRU 3 may receive and send multiple AxC sub-flows. The traffic between DU 4 and RRU 3 (in either direction) is called fronthaul traffic. In some examples, the RRU 3 may alternatively be called Radio Equipment (RE). In some examples, the DU 4 may alternatively be called a Main Unit (MU), Radio Equipment Controller (REC) or Baseband Unit (BBU). The RRU 3 communicates with a DU 4 using an interface standard, such as CPRI. References to CPRI are for example only, and may be replaced with a reference to any interface protocol for carrying data (e.g. in digital form) between a RRU and DU which uses a TDM-like format. A clock 31 is maintained at the RRU 3. Clock 31 provides a frequency reference for the RRU, such as when generating RF signals. Clock 31 also provides a phase reference for timing purposes, such as timing of RF transmissions.

Figure 2B:
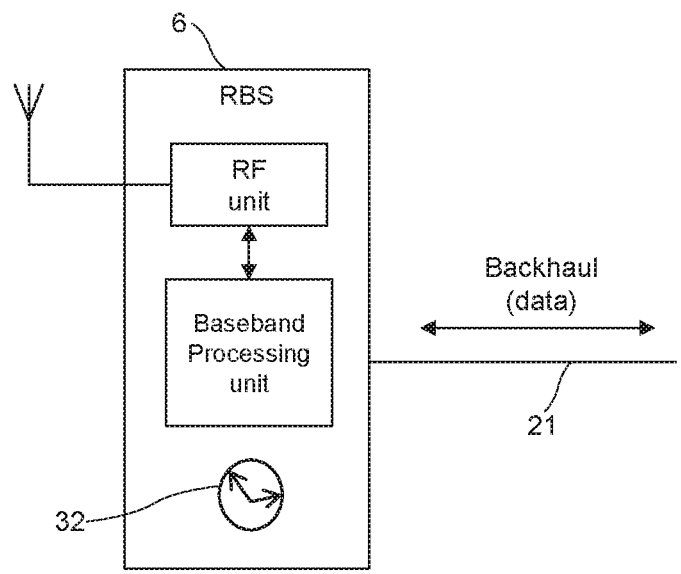

The second type of base station 6, shown in FIG. 2B, does not have the split of radio (RF) and baseband functionality. Instead, in the base station 6 all of the functionality of the base station is combined. The radio (RF) unit and baseband processing unit are co-located. The term "co-located" means the radio functionality and baseband processing unit at the same cell site. It will be understood that there may be a small physical separation between the radio (RF) unit and the baseband processing unit at a cell site. For example, a radio unit may be located at the top of a tower or building and a baseband processing unit may be located at the base of the tower or building. This type of separation falls within the term "co-located". The base station receives data, performs processing at baseband, and transmits/receives RF signals. This type of base station is an integrated, or monolithic, base station and will be referred to as a radio base station RBS 6. An RBS 6 does not output a CPRI signal, since the baseband processing is implemented internally. An RBS 6 outputs and receives data in a different format than used by a RRU for radio transmission or baseband processing (e.g. CPRI). The traffic carried over the transport network 20 to and/or from the RBS 6 is called backhaul traffic. The RBS 6 communicates with the core network and other base stations. In some examples, the RBS 6 communicates with the core network and other base stations using the same transport protocol for at least some transport layers. For example, the RBS 6 uses a packet based data transport. In some examples, the RBS 6 uses Ethernet, as defined by IEEE 802.1 and IEEE 802.3. References to Ethernet are for example only, and may be replaced with a reference to any protocol for exchanging data to or from a radio base station, for example, packet transport. The transport connecting a base station may be based on a Layer 2 protocol on the Open Systems Interconnection model (OSI) model, or on a Layer 3 protocol. The RBS 6 may be a base station providing a micro cell or a pico cell, such as localised indoor coverage. A clock 32 is maintained at the RBS 6. Clock 32 provides a frequency reference for the RBS, such as when generating RF signals. Clock 32 also provides a phase reference for timing purposes, such as timing of RF transmissions.

Base stations RBS 6 (with baseband processing) and RRUs 3 (without baseband processing) may both be considered as radio equipment.

Returning to FIG. 1, the DUs 4 may be located in a DU pool 5 comprising a plurality of DUs 4. The DU pool 5 may be called a DU cloud or a baseband hotel. A term 'baseband processing unit' may refer to a DU 4 or a DU pool 5 in which baseband processing is performed for one or more RRUs 3.

The RRUs 3 and RBSs 6 are deployed across an area where wireless coverage is required. A transport network 20 connects to RRUs 3, RBSs 6 and a node 10. The transport network 20 may comprise a ring topology (as shown in FIG. 1), a hub and spoke topology, a mesh topology or any other network topology. The transport network 20 is configured to carry fronthaul traffic (i.e. traffic between a RRU 3 and a DU 4) and backhaul traffic (i.e. traffic between a RBS 6 and a core network 18). In other words, the transport network 20 is shared by the traffic for the two types of base station. For avoidance of doubt, the term "fronthaul traffic" can cover both transport directions, i.e. a forward direction from DU 4 to RRU 3, and a reverse direction from RRU 3 to DU 4. Similarly, the term "backhaul traffic" can cover both transport directions, i.e. a forward direction from Eth switch 14 to RBS 6, and a reverse direction from RBS 6 to Eth switch 14. The transport network 20 may also carry control data for coordination between radio nodes. A transport network 20 which carries fronthaul traffic and backhaul traffic may be called a hybrid fronthaul/backhaul network, or an xhaul network.

The transport network 20 comprises remote switches 16. A remote switch 16 connects to an RRU 3 and to an RBS 6. A remote switch 16 is the node in the transport network 20 where fronthaul traffic and backhaul traffic are separated.

A remote switch 16 may connect to one or more RRU 3 and to one or more RBS 6. Other remote switches 16 may only connect to an RRU 3, or only to an RBS 6. The combination of a remote switch 16 and the base stations that it serves will be called a cluster 2.

The transport network 20 comprises a network node 10, which may be considered as a central hub or central office (CO). The central hub 10 is connected between the radio nodes (RRUs 3 and RBSs 6) and the DUs 4. The central hub 10 may be geographically separate to the RRUs and DUs, or co-located with the DUs. In the example network of FIG. 1, the hub 10 is co-located with a DU pool 5. The central hub 10 may be considered as a node of the transport network, or as a node of the radio access network. The central hub 10 comprises a hub switch 13. The hub switch 13 can be an optical and/or CPRI switch or cross-connect.

The RRUs 3 are connected with the DUs 5 via the transport network 20. The transport network 20 is configured to connect a selected RRU 3 with a selected DU 4 or DU pool 5. In some examples, the transport network 20 allows a connection to be selected between any one of the DUs 4 and any one of the RRUs 3.

Transport network 20 may comprise optical transmission equipment. An optical connection 21 may connect the hub 10 to the remote switches 16. The optical connection 21 may use a plurality of wavelengths. For example, the optical connection 21 may be configured to carry a Wavelength Division Multiplexed (WDM) signal or a Dense WDM (DWDM) signal.

Returning to FIG. 1, hub switch 13 at the central hub 10 comprises an optical and/or CPRI cross-connect. The central hub 10 comprises a main switch or cross-connect 31. The switch 13 is configured to cross-connect, i.e. switch, data between the RRUs 3 and DUs 4. The switch 13 is configured to switch the data transported between RRU 3 and DU 4 according to the interface standard, for example CPRI. As such, the switch 13 is a CPRI switch. In some examples, the switch 13 is an electronic switch. The CPRI switch may be configured to perform switching at different granularities, as explained in more detail below.

The switch 13 is also configured to switch data to, or from, the radio base stations 6. For example, the switch 13 is configured to switch Ethernet data. Further details of the switch 13 configured to switch data to or from a base station is described below. In this example, the switching is based on Layer 2 switching. Alternatively, switching at Layer 3 may be implemented.

The switch 13 may function as a lambda switch. As such, lambdas (wavelengths of light) are switched or cross-connected. The lambda switch function may be used for switching of CPRI data and/or Ethernet data. In some examples, the switch 13 is configured to provide for switching at a plurality of different granularities or layers. In particular, the switch 13 may be operated at different granularities, for example, down to an AxC level of the fronthaul traffic. In some examples, the electronic switch (cross-connect) is able to switch received data at one or more level or layer, as described in more detail below.

In some examples, switch 13 may be considered as a multi-layer switch. At a first layer, the switch 13 switches optical wavelengths, e.g. by using a Wavelength Selective Switch (WSS) or optical grey channels, e.g. by using a fiber cross connect. For example, one implementation is based on DWDM with optical-electronic-optical (OEO) regeneration, where optical wavelengths are converted in the electrical domain by means of transponders and switched electrically, e.g. by using an analogue cross-point switch. At a second layer, the switch granularity is less than a wavelength, for example, cross-connecting CPRI or Ethernet sub-flows with a determined granularity. The switch 13 is configured to selectively combine wavelengths (lambda granularity), and/or to combine CPRI flows, e.g. at 2.5G (CPRI granularity) and/or AxC sub-flows (AxC granularity).

The multi-layer switch 13 is able to switch data at a plurality of different layers or granularity levels. This provides for the cross-connect to change an input to an output at a plurality of different layers. For example, the input is included in an output which is controlled at a plurality of different layers (e.g. lambda, CPRI, AxC) of the cross-connect; the output at each of the plurality of different layers being controlled by the multi-layer cross-connect. The plurality of different layers may refer to any two or more of the layers or granularities, e.g. two or more of AxC, CPRI (including any data rate, e.g. 2.5G, 10G), SAP (described below), or lambda (wavelength) granularity.

The central hub 10 performs electrical-optical conversion for outgoing signals (towards remote switches 16) and performs optical-electrical conversion for ingoing signals (received from remote switches 16).

The central hub 10 further comprises a packet switch 14. The packet switch 14 is configured to switch traffic between a connection to a backhaul network 17 and the switch 14. The packet switch 14 may also be configured to switch traffic between the backhaul connection and the DU pool 4. In some examples, the packet switch 14 switches using the same protocol as the RBSs 6 or DUs 4 used for backhaul. The packet switch 14 may be an Ethernet switch. The packet switch 14 may alternatively be referred to as a backhaul switch, configured to control switching onto the backhaul 17. The packet switch 14 operates at Layer 2 to switch traffic to its destination. Alternatively, the switch 14 may be a Layer 3 router.

The switch 13 and packet switch 14 may be considered together as a switch system or switch arrangement. The switch 13 and packet switch 14 are co-located in the central hub 10.

As described above, the transport network 20 comprises a remote switch 16 for each cluster 2. The remote switch 16 is configured to switch traffic to/from the RRU 3 and the central hub 10. The remote switch 16 is configured to switch traffic to/from the RBS 6 and the central hub 10. Communication between a port of the remote switch 16 and an attached RRU 3 or RBS 6 may be with a further optical connection or with an electrical connection.

The remote switch 16 is configured to handle data traffic for both a RBS (e.g. Ethernet) and a RRU (e.g. CPRI). In some examples, the remote switch 16 is a lambda switch, configured to switch one or more wavelengths to the destination RBS or RRU. In some examples, the remote switch 16 is a reconfigurable optical add-drop multiplexer (ROADM). In this example, each RBS or RRU uses one or more lambda. Each lambda is particular to a RBS or RRU. Alternatively, the remote switch 16 is configured to combine data from two or more RBS or RRU (in any combination) onto a single lambda. In some examples, data from both a RBS and a RRU are carried together on the same lambda. In this case, the digital unit is configured to use a framing protocol to transmit RBS data (e.g. Ethernet frames) and RRU data (e.g. CPRI frames) together in the same optical channel. A corresponding framing is also carried out by the switch 13.

Figure 3A:
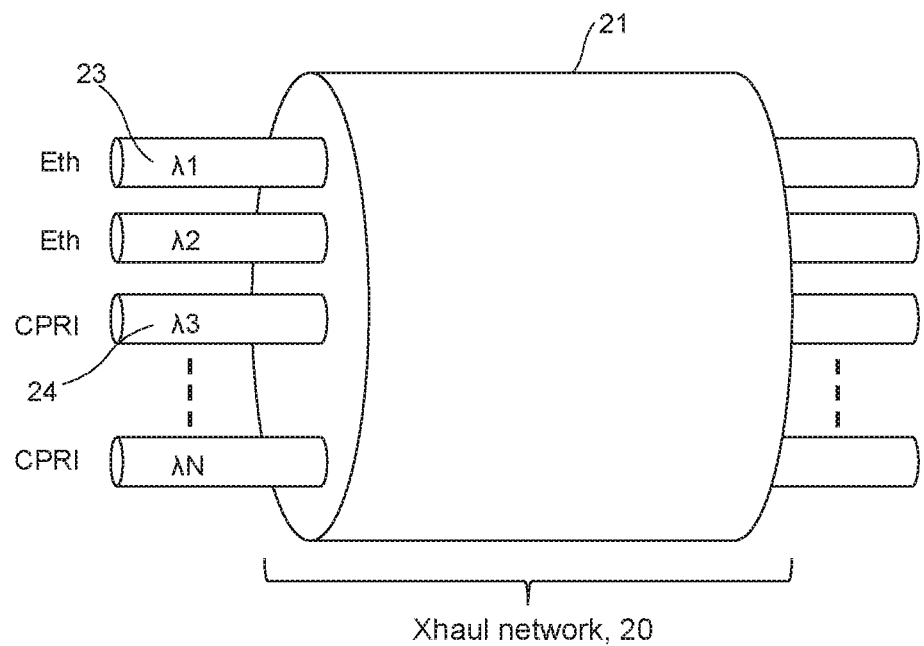
FIGS. 3A and 3B show two ways of carrying traffic in the network of FIG. 1.
Figure 3B:
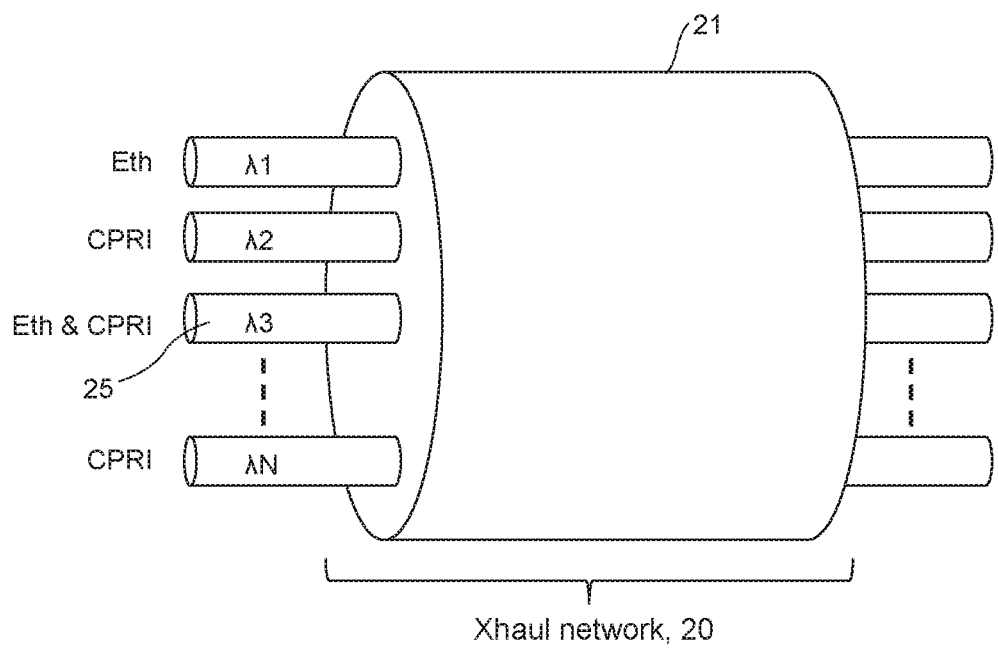

FIGS. 3A and 3B show two possible ways of carrying fronthaul traffic and backhaul traffic over an optical connection 21 of the transport network 20. In FIG. 3A, fronthaul traffic (CPRI) and backhaul traffic (Eth) are carried on separate optical wavelengths (lambdas). In this example, backhaul traffic is carried on λ1 and λ2 and fronthaul traffic is carried on λ3 and λN. In FIG. 3B, at least one optical wavelength can carry a combination of fronthaul traffic (CPRI) and backhaul traffic (Eth). In this example, a combination of fronthaul traffic (CPRI) and backhaul traffic (Eth) is carried on λ3.

In some examples, the remote switches 16 may be considered as multiplexing/switching modules. The remote switches 16 allocate and groom multiple CPRI flows in a single optical channel for communication with the hub 10. The remote switch 16 may be considered as a multiplexer/demultiplexer. The multiplexer/demultiplexer is configured to WDM multiplex/demultiplex optical signals to/from the switch 13. In some examples, data flows from a plurality of RRUs and/or RBSs are wavelength multiplexed/demultiplexed by the optical multiplexer/demultiplexer at the remote switch 16. The multiplexer/demultiplexer at remote switch 16 can be configured to demultiplex optical channels received from the switch 13, and WDM multiplex optical channels for transport to the switch 13. As such, the multiplexer/demultiplexer at remote switch 16 and multiplexer/demultiplexer at switch 13 provide for WDM multiplexed transport between the switch 13 and clusters 2. As described above, the data for a plurality of radio nodes (RBS or RRU)

may be multiplexed/demultiplexed by the remote switch 16 on a single optical channel, i.e. signal lambda. In some examples, the remote switches 16 are configured to time division multiplex (TDM) data flows relating to a plurality of RRUs and/or RBSs on a same optical channel. The optical channel may be provided by an optical signal, e.g. a particular wavelength in a WDM system, or a grey optical signal in a fibre whose wavelength is not strictly defined.

The switch 13 and one or more remote switch 16 are connected to a controller 19. The controller 19 is arranged to configure and coordinate the switch 13 at the central hub 10 and the remote switches 16. The controller 19 may also control the packet switch 14.

For background information, FIG. 4 shows the framing structure of a CPRI interface. A Remote Radio Head (RRH) frame is 10 ms duration with a total of 150 Hyper Frames. One Hyper Frame comprises 256 basic RRH frames. Each RRH basic frame comprises 16 words with index W ranging from 0 to 15. The length of a basic CPRI frame is 1 Tc equal to 260.4 ns time duration (Index X), where:

$$Tc = 1/Fc = 1/3.84 \times 10^{-6} = 260.4 \text{ ns}.$$

In a CPRI frame structure, one of the 16 words is used as a control word and the remaining 15 words are used to carry user plane IQ data. Control sub-channels are formed by control words carried by the individual basic frames. For example, control sub-channel #0 is formed from control words carried by a sub-set of the basic frames in a Hyper Frame, control sub-channel #1 is formed from control words carried by the next sub-set of the basic frames in a Hyper Frame, and so on. The CPRI interface supports various line rates, such as: 614.4 Mbps (option 1); 1228.8 Mbps (option 2); 2457.6 Mbps (option 3); 3072.0 Mbps (option 4); 4915.2 Mbps (option 5); 6144.0 Mbps (option 6); 9830.4 Mbps (option 7); 10137.6 Mbps (option 8). In one possible example, the clock frequency is derived from the line code. Typically, CPRI uses 8B/10B line coding which maps 8-bit symbols to 10-bit symbols. This achieves DC-balance and prevents long strings of zeros to allow a receiving node to recover a clock from the line coded digital signal.

Figure 5A:
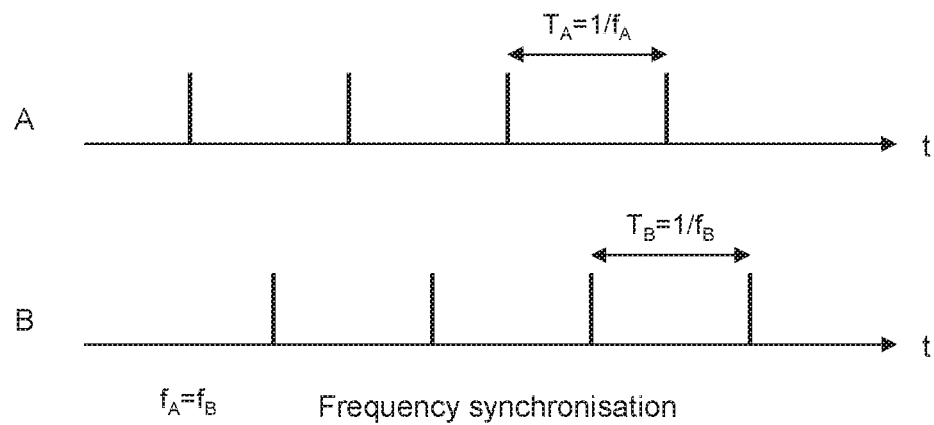
FIGS. 5A-5C show types of synchronisation for a pair of nodes.
Figure 5B:
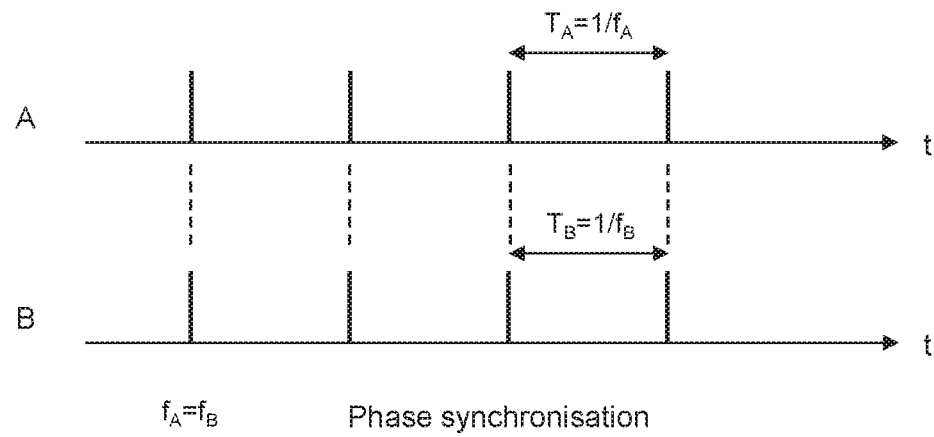
Figure 5C:
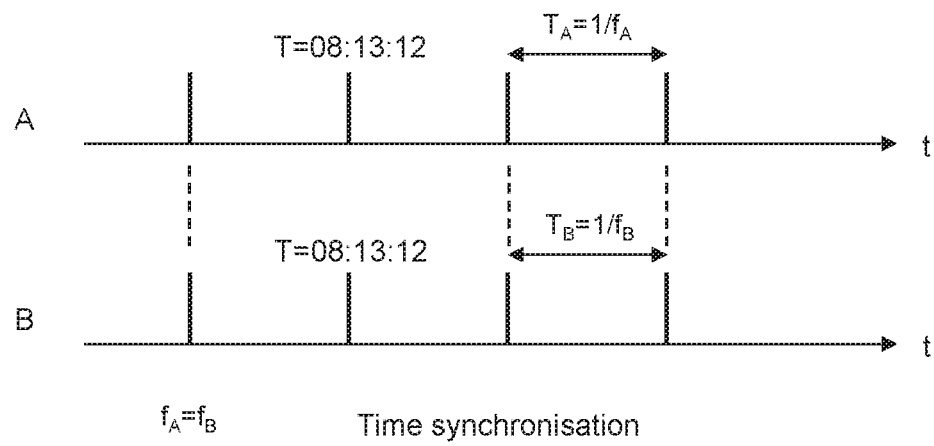

Before describing ways of providing synchronisation in the network, it is helpful to explain some terms. FIGS. 5A-5C illustrate three types of synchronisation: frequency synchronisation (FIG. 5A); phase synchronisation (FIG. 5B); and time synchronisation (FIG. 5C). Two clocks are considered: a clock A at a first node and a clock B at a second node. A time line of each clock A, B, shows a series of clock "ticks". A clock tick could occur at a granularity of a second, a minute or some other granularity of time.

FIG. 5A shows frequency synchronisation. When two clocks are synchronised in frequency, the clock ticks at clocks A and B occur at the same rate, i.e. $T_A=1/f_A$, and $T_B=1/f_B$ and $f_A=f_B$.

FIG. 5B shows phase synchronisation. When two clocks are synchronised in phase, the clock ticks at clocks A and B occur at the same rate, i.e. $T_A=1/f_A$, and $T_B=1/f_B$ and $f_A=f_B$, and also the clock ticks are aligned in time with one another. That is, the clock tick at clock A occurs at the same point in time as the clock tick at clock B.

FIG. 5C shows time synchronisation. This is the same as phase synchronisation, with the additional feature that both clocks are set to the same time (e.g. time of day). In this example, a tick occurs at both clocks at the same time, and both clocks are aware that the time=08:13:12.

Figure 6:
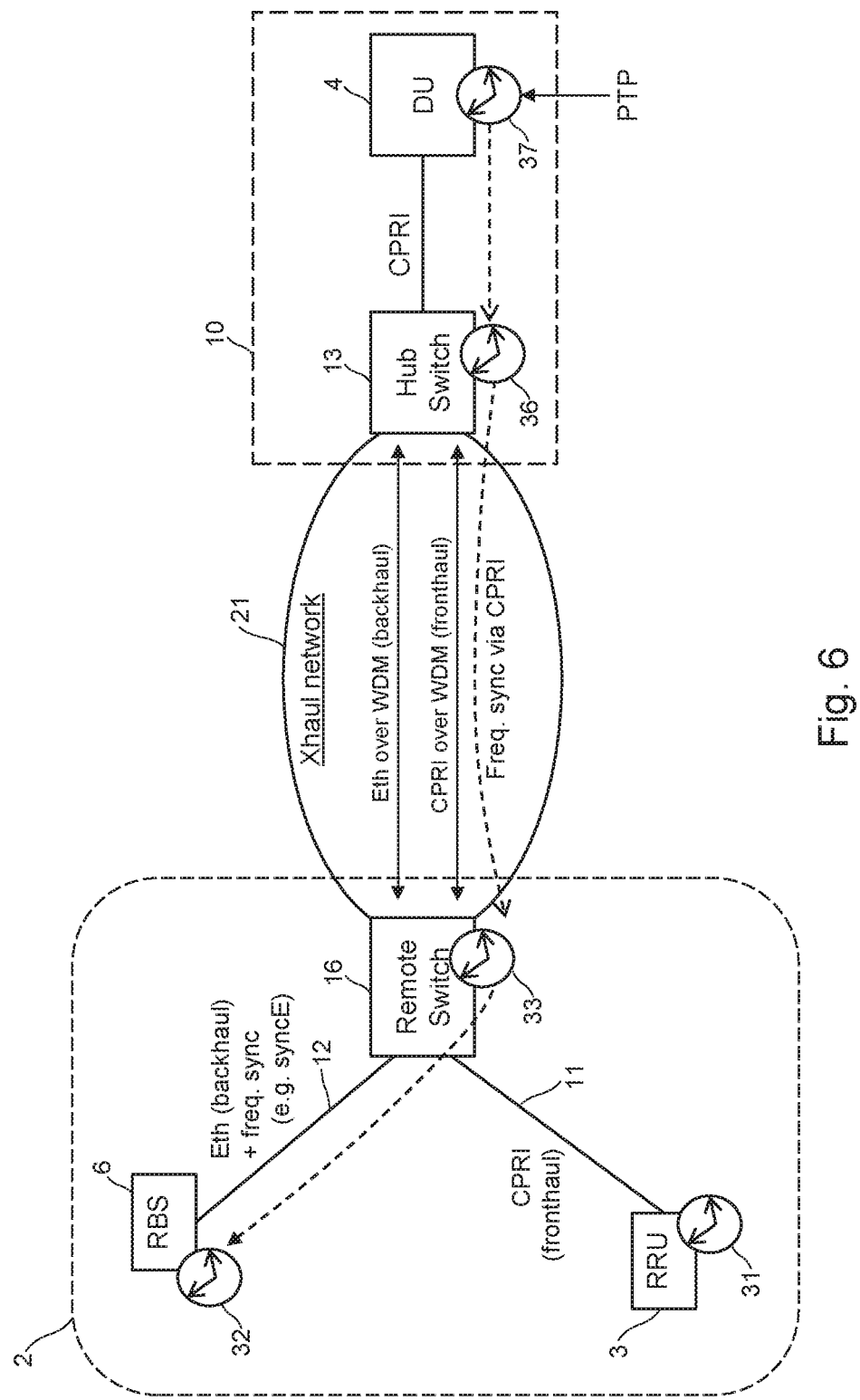
FIG. 6 shows frequency synchronisation in the network of FIG. 1.

FIG. 6 shows an example of providing frequency synchronisation of two base stations: RBS 6 and RRU 3 in a cluster 2 served by a remote switch 16. Although one RBS 6 and one RRU 3 is shown, it will be understood that multiple RRUs 3 and/or multiple RBSs 6 can be connected to the remote switch 16 at a cluster 2. RRU 3 and RBS 6 each have a respective clock 31, 32. An aim of the synchronisation scheme is to synchronise the frequency at which the clocks 31, 32 operate. According to an aspect of the disclosure, a common frequency synchronisation is provided to RRU 3 and RRU 6.

The TDM frame structure of the physical layer of the CPRI interface received at the remote switch 16 provides an accurate frequency reference. Frequency synchronisation is distributed over the transport network 21 between the hub switch 13 and the remote switch 16 using the inherent frequency of the physical layer carrying the frame where both CPRI traffic (and, optionally, non-CPRI traffic) is mapped.

At the remote switch 16, fronthaul traffic is transmitted, or forwarded, to the RRU 3. At RRU 3, the frequency of the CPRI frame structure is extracted and used to set the frequency of the clock 31 at the RRU 3. The remote switch 16 transmits, or forwards, backhaul traffic to the RBS 6. The backhaul traffic may be received from hub switch 13 on the same wavelength (lambda), or on separate lambdas. Also, at the remote switch 16, the frequency of the CPRI frame structure is extracted and used to send a frequency synchronisation signal to RBS 6. As explained above, the CPRI line rate may be extracted and used as a frequency reference.

There are various ways in which remote switch 16 can send the frequency synchronisation signal to RBS 6. In one example, the link 12 between the remote switch 16 and the RBS 6 can be a Synchronous Ethernet link. The remote switch 16 can embed a clock on the synchronous Ethernet link 12, e.g. according to ITU-T standard G.8262/Y.1362 "Timing characteristics of synchronous Ethernet equipment slave clock". The frequency synchronisation signal is combined with the backhaul traffic, carried as Ethernet packets, on the same synchronous Ethernet link 12. In another example, the link between the remote switch 16 and the RBS 6 can be a dedicated link. The remote switch 16 can embed a clock on the dedicated link 12. In each of these examples, the remote switch 16 uses the frequency of the CPRI signal received via network 20 to set the frequency of the clock sent on link 12. At RBS 6, the frequency of the clock signal received on link 12 is extracted and used to set the frequency of the clock 32. The frequency of the clock signal sent on link 12 can be scaled compared to the frequency of the CPRI signal. The scaling can be an integer scaling factor (e.g. 2, 3, 10) or a fractional scaling factor (e.g. 0.5, 1.5). That is, the frequency of the frequency synchronisation signal sent on link 12 can be different to the frequency of the CPRI signal.

The CPRI signal received over transport network 21 is synchronised in frequency to a clock 36 at the central hub 10. The DU 4 can also have a clock 37. Clocks 36, 37 are synchronised to an accurate external frequency synchronisation source by a mechanism such as PTP (IEEE 1588), an input from a Global Positioning System (GPS) receiver, a clock recovered from a synchronous Ethernet link, or another source. In the example shown in FIG. 6, DU 4 receives an input from an external source and then provides frequency synchronisation information to clock 36 at the hub switch 13. FIG. 6 shows two clocks 36, 37 as the hub switch 13 is typically a separate item from the DU 4, and the hub switch 13 and DU 4 may be located apart from one another. In other possible examples, such as where the hub switch 13 and the DU 4 are co-located, a single clock may be used by the hub switch 13 and the DU 4.

By using the signal received over the transport network 20 as a frequency reference, and distributing it to the RRU 3 and the RBS 6, the RRU 3 and the RBS 6 are brought into frequency sync with one another. Also, other radio nodes connected to other remote switches 16 (FIG. 1) of the same transport network 20 are brought into sync with the RRU 3 and the RBS 6 at cluster 2. Using the frequency of the CPRI TDM interface has an advantage of avoiding the need to provide a separate frequency synchronisation scheme for RBS 6, and reducing possible errors.

FIGS. 7 to 10 show schemes for phase/time synchronisation of an RBS 6 and an RRU 3 at a cluster 2.

Figure 7:
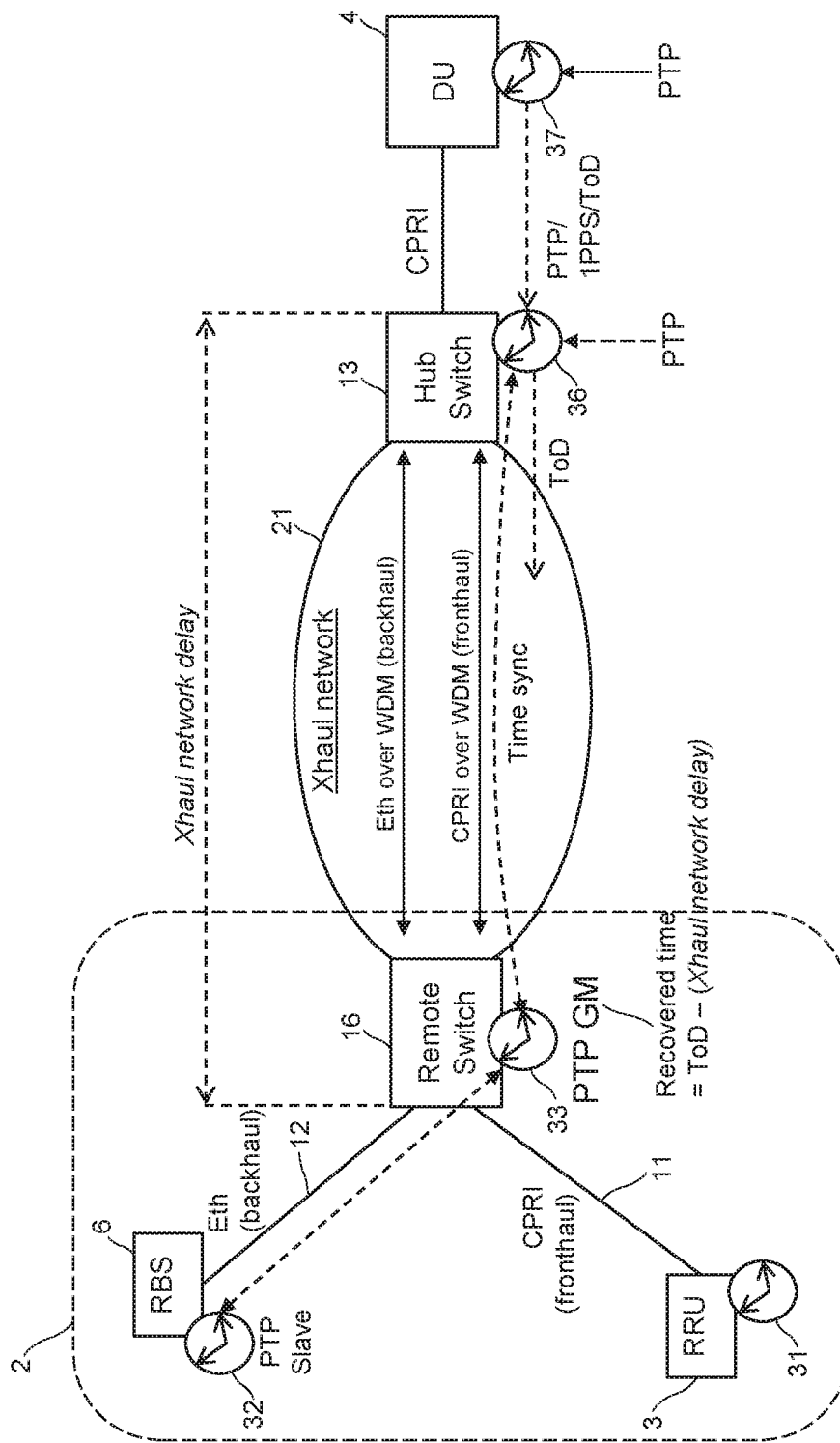
FIG. 7 shows an example of phase/time synchronisation in the network of FIG. 1.

FIG. 7 shows a first scheme for phase/time synchronisation. An accurate clock 33 is maintained locally at the remote switch 16. This clock can, for example, be a PTP Grand Master (PTP GM). Clock 33 at the remote switch 16 is used to provide accurate phase/time information locally to the RBS 6 in the cluster 2. The time information can comprise phase and time of day (ToD).

Accuracy of the clock 33 can be maintained by using synchronisation messages carried over the transport network 21 between the hub switch 13 and the remote switch 16. CPRI provides a mechanism for calculating transmission delay across the network. For example, two-way timestamps in the CPRI frame overhead can be used to calculate the transmission delay between the hub switch 13 and the remote switch 16. This mechanism is described at section 4.2.9 of CPRI Specification V6.1. In addition, the hub switch 13 can send additional messages at regular intervals. The new messages can indicate a timestamp, providing time of day (ToD) information. ToD is something which is not normally available beyond the DU 4 in a conventional CPRI network, i.e. not available between the DU 4 and remote switch 16. Remote switch 16 uses a combination of: the messages indicating time of day (ToD), plus the calculated transmission delay, to calculate the actual time:

Recovered time=ToD−(transmission delay)

Remote switch 16 can exchange time synchronisation messages with RBS 6, over link 12, to bring a clock 32 at the RBS 6 into sync with the accurate clock 33 maintained at the remote switch 16. The time synchronisation messages between the remote switch 16 and the RBS 6 can be PTP messages (IEEE 1588). The clock 32 at the RBS 6 can be considered as a PTP slave to the PTP GM at the remote switch 16. This scheme can achieve a high degree of accuracy, such as a few tens of ns. This is sufficient to allow Multiple Input Multiple Output (MIMO) wireless schemes between RRU 3 and RBS 6.

The mechanism described at section 4.2.9 of CPRI Specification V6.1 can also be used by RRUs 3 to maintain phase synchronisation between RRUs 3.

The hub switch 13 can obtain accurate phase/time information from an external time reference using a mechanism such as PTP. The external time reference can be a higher-order (i.e. more accurate) clock. Alternatively, the DU 4 may acquire accurate phase/time information from an external time reference using a mechanism such as PTP and the clock 36 at the hub switch 13 synchronises with the clock 37 at the DU 4.

In the example described above, a clock 32 at the RBS 6 is phase synchronised with a clock 31 at the RRU 3. RBS 6 is also aware of time of day, due to the PTP exchanges with the clock 33 at the remote switch 16. The RRU 3 may not be aware of time of day, as CPRI does not provide time of day beyond the DU 4. Alternatively, there may be some mechanism of sending time of day to the RRU 3.

The new message carrying a time stamp with time of day information can be carried as part of the frame overhead of the frame carrying the CPRI signal. An example packet rate is at least 16 packets per second, pps. This is a standard packet rate defined by ITU-T G.8275.1. However other profiles/packet rate may be applicable (e.g. 64 pps). Signalling messages can be exchanged between nodes to perform the Best Clock Master Algorithm (BMCA) of IEEE 1588.

The PTP GM at the remote switch 16 may also be used to provide a PTP reference for an RRU 3.

Figure 8:
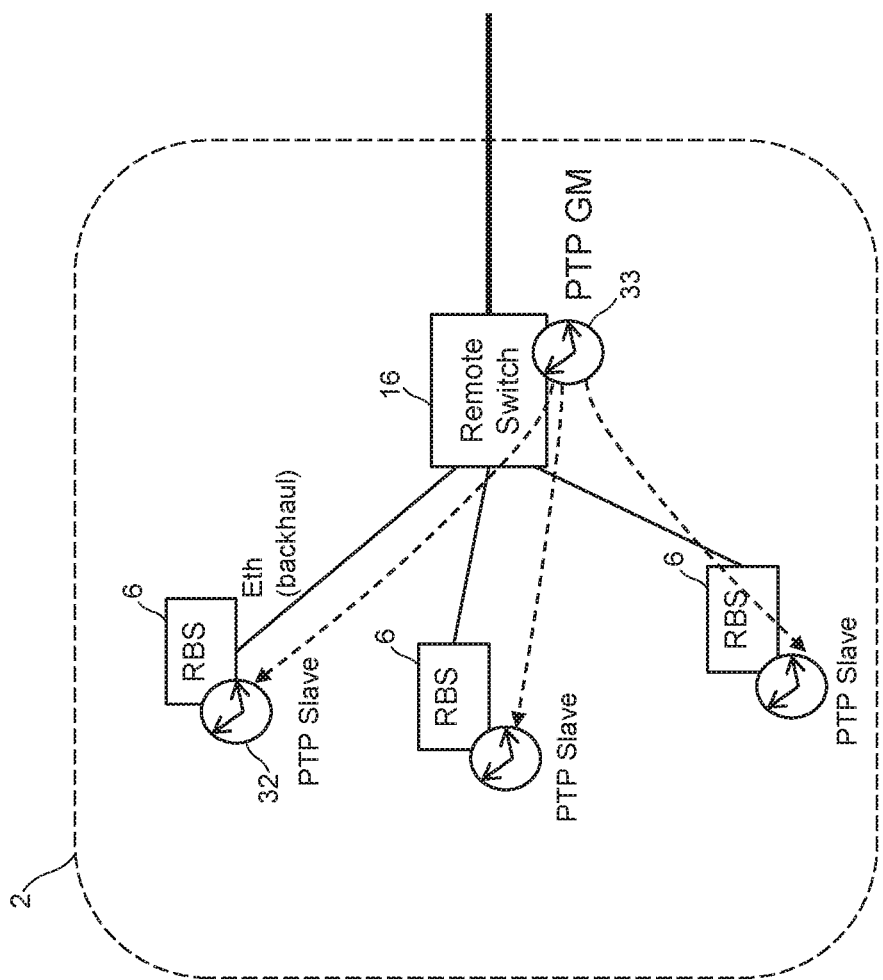
FIG. 8 shows an example of phase/time synchronisation for a cluster of base stations and a remote switch.

FIG. 8 shows part of the network of FIG. 7, with multiple RBSs 6 in cluster 2. Each RBS 6 performs an exchange of phase/time sync messages (e.g. PTP messages) with the remote switch 16. In this way, a clock 32 at each RBS 6 is synchronised with the clocks at other RBSs 6 and a clock at the hub switch 13 (not shown). An advantage of maintaining an accurate clock at the remote switch 16 is a minimisation of the amount of time synchronisation messages which are carried across the part of the transport network between the hub switch 13 and the remote switch 16, since the PTP exchanges between each RBS 6 and the remote switch 16 are localised.

Figure 9:
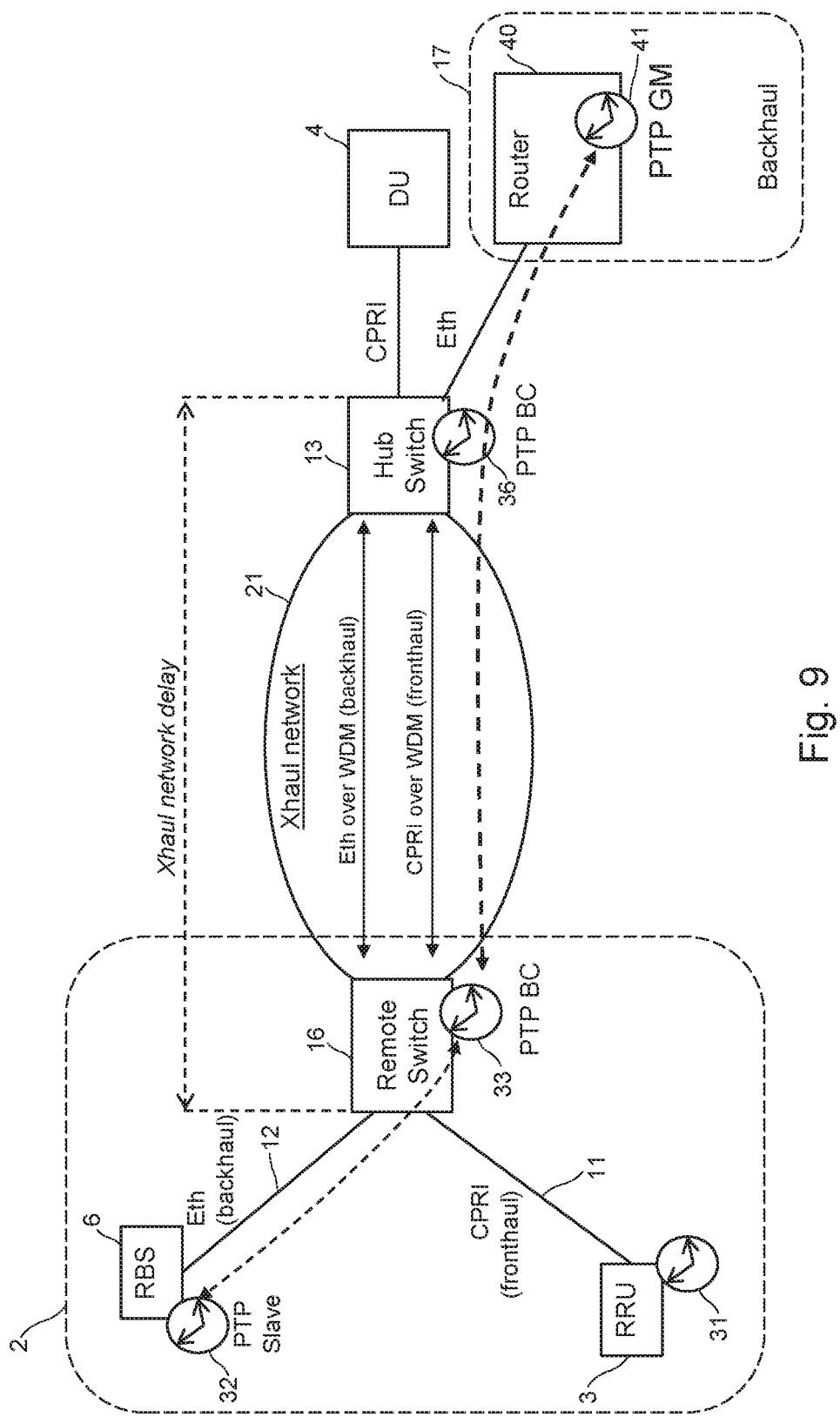
FIG. 9 shows another example of phase/time synchronisation for a cluster of base stations and a remote switch.

Various other schemes are possible. These differ in the type of PTP clock used at the hub switch 13 and the remote switch 16. FIG. 9 shows another possible scheme with a PTP GM 41 in a backhaul router 40, and a PTP Boundary Clock, BC, in both the hub switch 13 and the remote switch 16. PTP mean path delay is supported by CPRI tools. Another possible scheme (not shown) provides a PTP slave clock at the hub switch 13 and the PTP is regenerated at the remote switch 16 (with a PTP GM).

Figure 10:
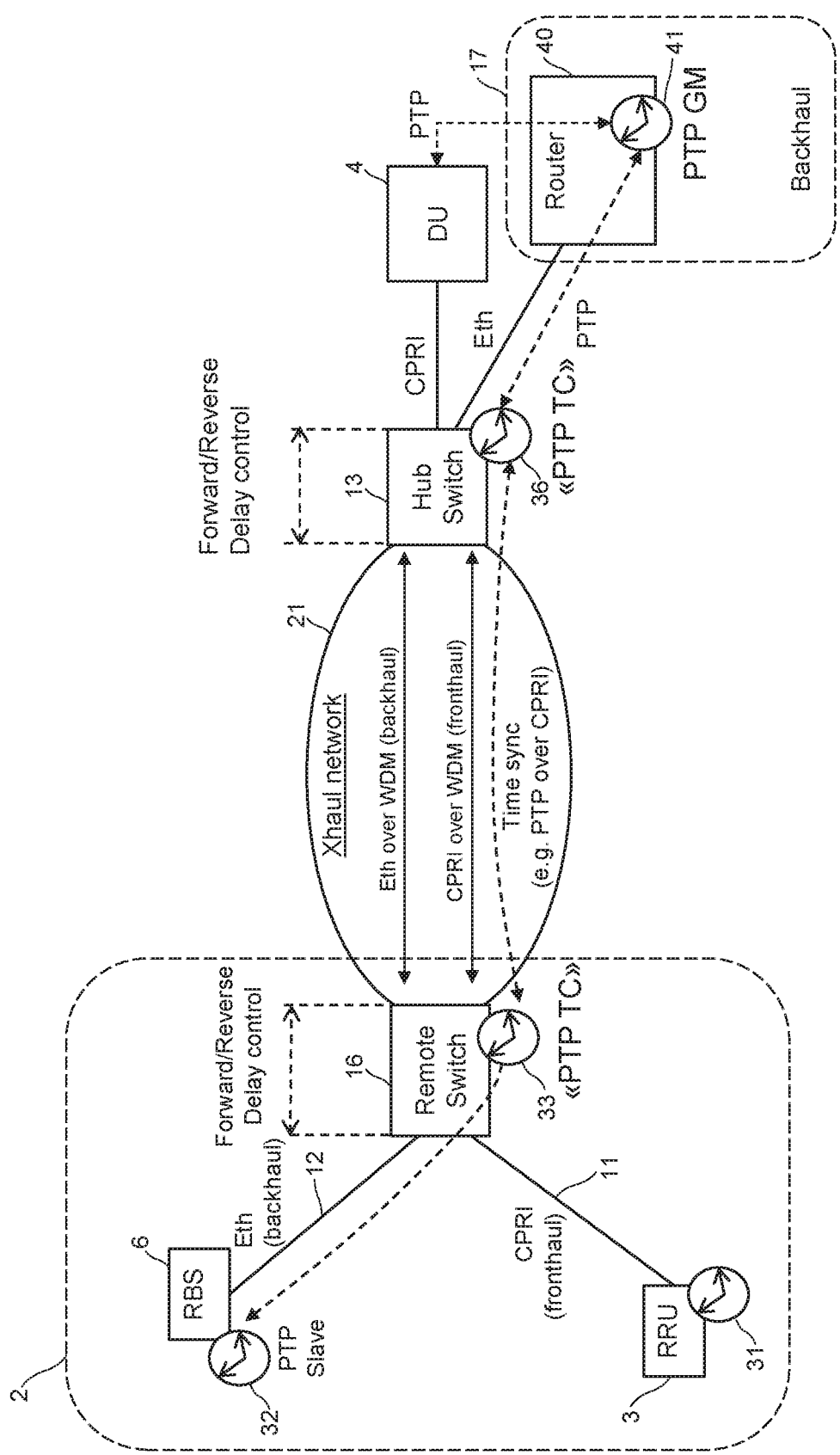
FIG. 10 shows another example of phase/time synchronisation in the network of FIG. 1.

FIG. 10 shows a second scheme for phase/time synchronisation. A time synchronisation protocol such as PTP is used to maintain a clock at a RBS 6 in sync with a remotely located, higher-order (i.e. more accurate), clock located remotely from the RBS 6. In the example shown in FIG. 10, the more accurate clock is a PTP GM 41 located at a router 40 in the backhaul network 17. Router 40 is one example of where a more accurate clock may be located. Router 40 (or alternative source) may also provide accurate time synchronisation information, via PTP, to DU 4. In another example, one of the DUs 4 in a DU pool 5 (FIG. 1) may host a PTP GM clock, and all RBSs 6 in clusters 2 can obtain accurate time synchronisation information from that PTP GM.

RBS 6 and router 40 exchange PTP messages according to IEEE 1588. This brings the slave clock 32 at RBS 6 into time sync with PTP GM 41. PTP messages can be carried as client traffic over transport network 20, or as overhead data over network 20. In an example where CPRI traffic (fronthaul) and Ethernet traffic (backhaul) are carried together in a common frame, an overhead portion of the common frame can be used to carry the PTP messages. The PTP port in the DU 4 is directly connected to the PTP port in the RBS 6 and the optical transport nodes guarantee a symmetric connection (i.e. a forward path through network 21 and a reverse path through network 21 incur the same delay).

PTP requires a two-way exchange of messages between a master node and a slave node. A round-trip delay is calculated between the slave node and the master node. This round-trip delay is then halved to obtain the delay of the slave node with respect to the master node. This delay, can be applied to a timestamp received from the master node to determine the actual time. A basic requirement of this method is for the paths used in the forward direction and the reverse direction of the round-trip path to be of equal delay, i.e. symmetric. In some cases, the forward path and the reverse path are not symmetric. An asymmetry is expected to be contributed mainly by the switch 13 and/or by the remote switch 16. One possible way of compensating for asymmetry is for the transport network itself to compensate for any asymmetry that it introduces. For example, a node can measure, and compensate for, any asymmetry that it introduces by a delay added by the node. The remote switch 16 or another node along the transmission path of the PTP message can compensate, within the node, for asymmetry between a forward path through the node and a reverse path through the node.

Another possible way of compensating for asymmetry is for a node to indicate any delay which has incurred in a path through that node (e.g. due to switching delays) as part of messages used in the PTP signalling exchange. For example, PTP packets include a correction field where the residence time of the packet at a node is indicated. A node (e.g. RBS 6) has access to the accumulated residence time for both transmission directions between the RBS 6 and node hosting the PTP GM and can use the accumulated residence time to compensate for asymmetry. The remote switch 16, or another node along the transmission path of the PTP message, can insert a correction value into at least one of the synchronisation messages between the RBS 6 wireless base station and the node which hosts the master clock, which PTP message passes through the remote switch 16.

Figure 11:
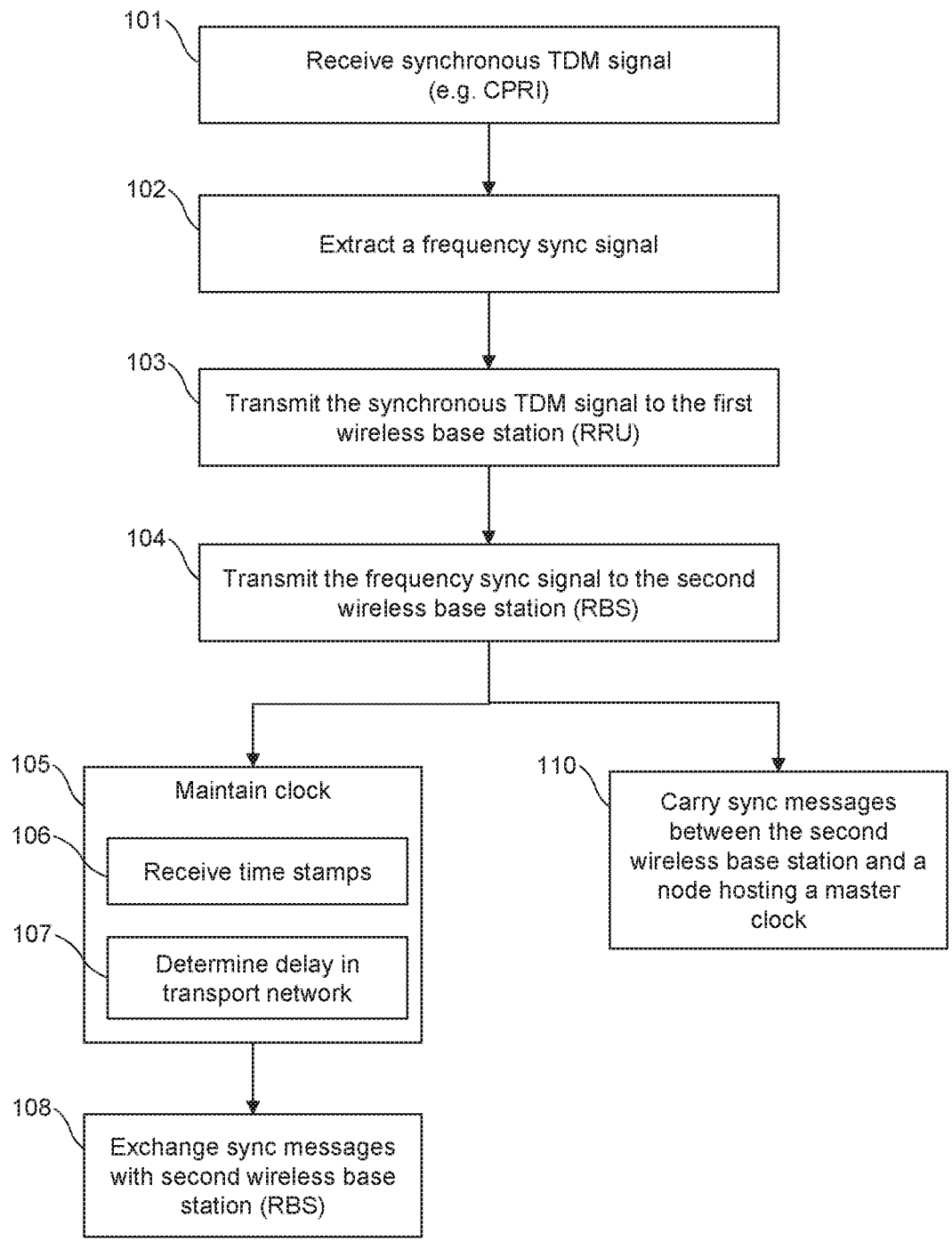
FIG. 11 shows a method performed by a node to implement synchronisation.

FIG. 11 shows a method performed at a remote switch 16. Blocks 101-104 show features related to frequency synchronisation. At block 101, the method comprises receiving a synchronous time division multiplexed communication signal which carries at least a first communication signal between the DU 4 and the RRU 3. At block 102, the method comprises extracting a frequency synchronisation signal from the synchronous time division multiplexed communication signal. At block 103, the method comprises transmitting the synchronous time division multiplexed communication signal to the RRU 3. At block 104, the method comprises transmitting the frequency synchronisation signal to the wireless base station 6. Blocks 105-108 and 110 show two alternative options for features related to phase/time synchronisation. Considering the first option, at block 105 the method comprises maintaining a first clock at the remote switch. This can comprise, at block 106, receiving time stamps from a second node (e.g. hub 10) of the transport network and, at block 107, determining a delay incurred by the transport network between the second node and the remote switch 16. At block 108 the remote switch exchanges synchronisation messages with the second wireless base station (RBS 6) for allowing a clock at the second wireless base station (RBS 6) to achieve phase synchronisation with the clock at the remote switch. Considering the second option, at block 110 the method comprises carrying synchronisation messages between the second wireless base station (RBS 6) and a node (e.g. node 40) which hosts a master clock. The time synchronisation messages are for allowing the wireless base station (RBS 6) to synchronise the clock at the second wireless base station (RBS 6) with the master clock.

Figure 12:
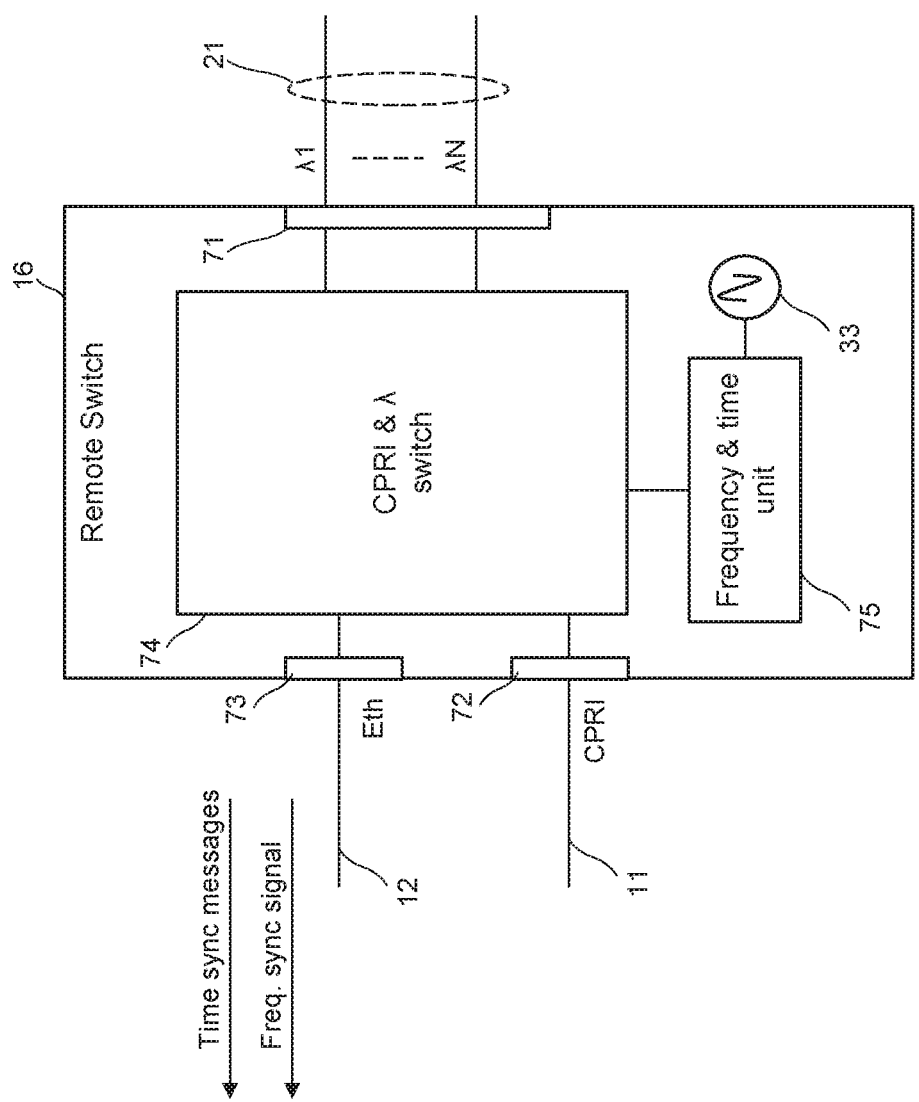
FIG. 12 shows apparatus at a remote switch of the network of FIG. 1.

FIG. 12 shows apparatus for use at the remote switch 16 of the network. The remote switch has an interface 71 with one or more communication links 21 carrying communications signals to and from hub 10. The interface 71 can be an optical interface with an optical connection 21. The remote switch has an interface 72 with one or more communication links 11 carrying communications signals to and from an RRU 3. The remote switch has an interface 73 with one or more communication links 12 carrying communications signals to and from an RBS 6. Interface 73 and link 12 can be Ethernet, or synchronous Ethernet. The remote switch has a switch 74. In some examples, switch 74 can be a CPRI and wavelength (lambda) switch. Switch 74 connects to interfaces 71, 72, 72. The remote switch may have a clock 33. A frequency and time unit 75 maintains clock 33. At least one of the communication signals received at the remote switch is a synchronous TDM signal, such as a CPRI signal. The frequency and time unit 75 may be configured to determine a frequency synchronisation signal from the TDM signal and to output the frequency synchronisation signal to interface 12, optionally via the switch 74. Depending on which phase/time synchronisation scheme is used, the frequency and time unit 75 may maintain an accurate clock 33 using information received via interface 71. The frequency and time unit 75 may participate in signalling exchanges with wireless base stations via interface 73 and switch 74.

Figure 13:
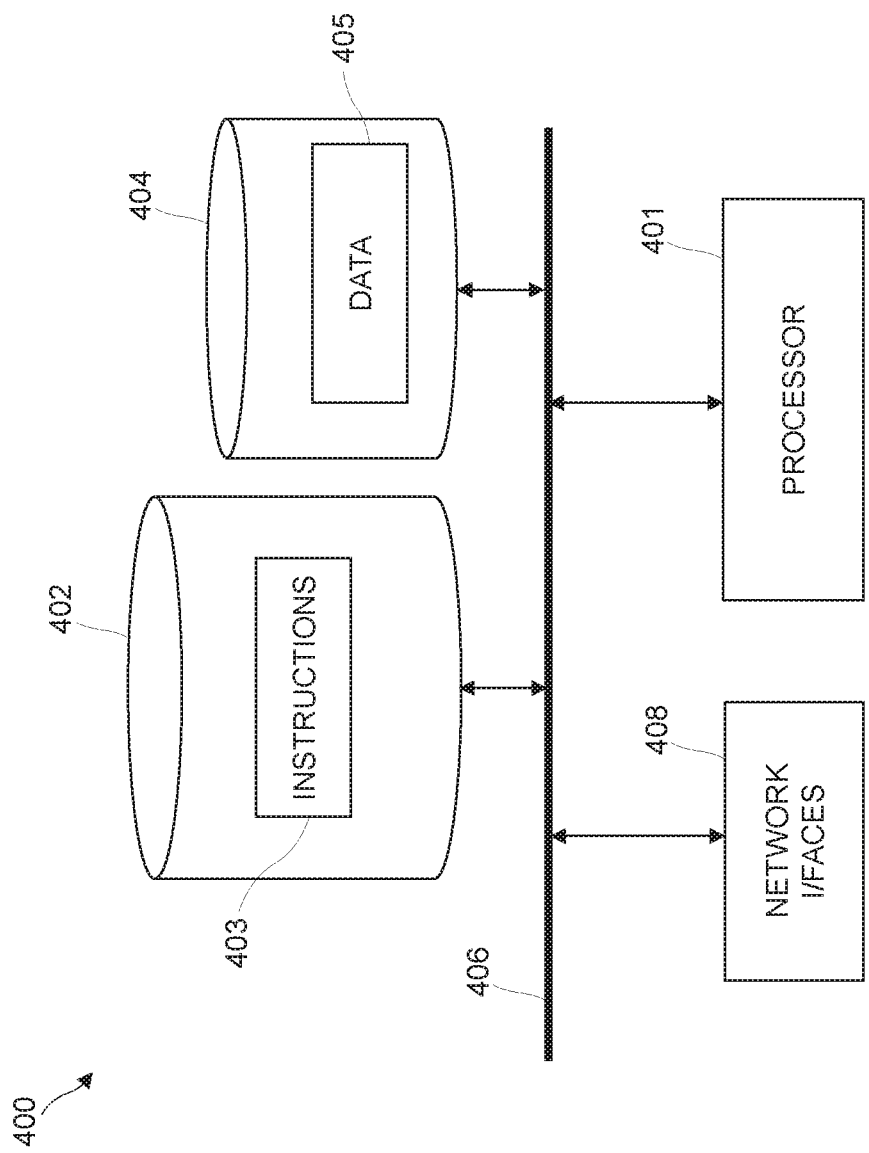
FIG. 13 shows apparatus for a computer-based implementation.

FIG. 13 shows an exemplary processing apparatus 400 which may be implemented as any form of a computing and/or electronic device, and in which embodiments of the system and methods described above may be implemented. Processing apparatus may implement all, or part of, the method shown in FIG. 11, or described or shown in earlier Figures. Processing apparatus 400 comprises one or more processors 401 which may be microprocessors, controllers or any other suitable type of processors for executing instructions to control the operation of the device. The processor 401 is connected to other components of the device via one or more buses 406. Processor-executable instructions 403 may be provided using any computer-readable media, such as memory 402. The processor-executable instructions 303 can comprise instructions for implementing the functionality of the described methods. The memory 402 is of any suitable type such as read-only memory (ROM), random access memory (RAM), a storage device of any type such as a magnetic or optical storage device. Additional memory 404 can be provided to store data 405 used by the processor 401. The processing apparatus 400 comprises one or more network interfaces 408 for interfacing with other network entities.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed at a first node of a hybrid fronthaul/backhaul network that is connected to a remote radio unit, to a baseband processing unit, and to a second wireless base station, wherein the method comprises:
  receiving a synchronous time division multiplexed communication signal which carries at least a first communication signal between the baseband processing unit and the remote radio unit;
  determining a frequency synchronisation signal from the synchronous time division multiplexed communication signal;
  transmitting the synchronous time division multiplexed communication signal to the remote radio unit; and
  transmitting the frequency synchronisation signal to the second wireless base station.

2. A method according to claim 1, further comprising:
receiving a second communication signal for the second wireless base station; and
wherein the frequency synchronisation signal is transmitted with the second communication signal to the second wireless base station.

3. A method according to claim 2, wherein:
the second communication signal is an Ethernet signal; and
the frequency synchronisation signal and the second communication signal are transmitted to the second wireless base station as a Synchronous Ethernet signal.

4. A method according to claim 2, wherein the synchronous time division multiplexed communication signal carries the first communication signal for the remote radio unit and the second communication signal for the second wireless base station.

5. A method according to claim 1, further comprising:
maintaining a first clock at the first node; and
exchanging synchronisation messages with the second wireless base station, wherein the synchronization messages are arranged to facilitate a clock at the second wireless base station to achieve phase synchronisation with the first clock at the first node.

6. A method according to claim 5, wherein the synchronisation messages are time synchronisation messages arranged to facilitate the clock at the second wireless base station to achieve phase and time synchronisation with the first clock at the first node.

7. A method according to claim 5, wherein maintaining the first clock at the first node comprises:
receiving time stamps from a second node of the hybrid fronthaul/backhaul network;
determining a delay incurred by the hybrid fronthaul/backhaul network between the second node and the first node; and
updating the first clock based on the time stamps and the determined delay.

8. A method according to claim 1, wherein:
the second wireless base station has a second clock; and
the method further comprises carrying synchronisation messages between the second wireless base station and a node which hosts a master clock, wherein the time synchronisation messages are arranged to facilitate the second wireless base station to synchronise the second clock with the master clock.

9. A method according to claim 8, further comprising compensating for asymmetry between a forward path through the first node and a reverse path through the first node.

10. A method according to claim 9, wherein compensating for asymmetry comprises one of the following:
compensating within the first node for asymmetry between a forward path through the first node and a reverse path through the first node; and
inserting a correction value into a particular synchronisation message between the second wireless base station and the node which hosts the master clock, wherein the particular synchronisation message passes through the first node.

11. A method according to claim 5, wherein the synchronisation messages are Precision Time Protocol (PTP) messages.

12. A method according to claim 1, wherein the synchronous time division multiplexed communication signal is a Common Public Radio Interface (CPRI) signal.

13. A network node of a hybrid fronthaul/backhaul network that is connected to a remote radio unit, to a baseband processing unit, and to a second wireless base station, wherein the network node comprises:
a processor; and
a memory containing instructions that, when executed by the processor, configure the network node to:
receive a synchronous time division multiplexed communication signal which carries at least a first communication signal between the baseband processing unit and the remote radio unit;
determine a frequency synchronisation signal from the synchronous time division multiplexed communication signal;
transmit the synchronous time division multiplexed communication signal to the remote radio unit; and
transmit the frequency synchronisation signal to the second wireless base station.

14. A network node according to claim 13, wherein execution of the instructions further configures the network node to:
maintain a first clock at the first network node; and
exchange synchronisation messages with the second wireless base station, wherein the synchronization messages are arranged to facilitate a clock at the second wireless base station to achieve phase synchronisation with the first clock at the first node.

15. A network node according to claim 14, wherein the synchronisation messages are time synchronisation messages arranged to facilitate the clock at the second wireless base station to achieve phase and time synchronisation with the first clock at the first node.

16. A network node according to claim 14, wherein the instructions that configure the network node to maintain the first clock further configure the network node to:
receive time stamps from a second node of the hybrid fronthaul/backhaul network;
determine a delay incurred by the hybrid fronthaul/backhaul network between the second node and the first node; and
update the first clock based on the time stamps and the determined delay.

17. A network node according to claim 13, wherein execution of the instructions further configures the network node to compensate for asymmetry between a forward path through the network node and a reverse path through the network node.

18. A method of operating a wireless system comprising a hybrid fronthaul/backhaul network that is connected to a remote radio unit comprising a first clock, to a baseband processing unit, and to a second wireless base station comprising a second clock, the method comprising:
performing the following operations at a first node of the hybrid fronthaul/backhaul network:
receiving a synchronous time division multiplexed communication signal which carries at least a first communication signal between the baseband processing unit and the remote radio unit;
determining a frequency synchronisation signal from the synchronous time division multiplexed communication signal;
transmitting the synchronous time division multiplexed communication signal to the remote radio unit; and
transmitting the frequency synchronisation signal to the second wireless base station;

and at the second wireless base station, using the frequency synchronisation signal to synchronise a frequency of the second clock with a frequency of the first clock.

19. A wireless system comprising:
a hybrid fronthaul/backhaul network;
a remote radio unit and a baseband processing unit which are connected by the hybrid fronthaul/backhaul network, the remote radio unit comprising a first clock;
a second wireless base station connected to the hybrid fronthaul/backhaul network, the second wireless base station comprising a second clock;
wherein a first node of the hybrid fronthaul/backhaul network is configured to:
  receive a synchronous time division multiplexed communication signal which carries at least a first communication signal between the baseband processing unit and the remote radio unit;
  determine a frequency synchronisation signal from the synchronous time division multiplexed communication signal;
  transmit the synchronous time division multiplexed communication signal to the remote radio unit; and
  transmit the frequency synchronisation signal to the second wireless base station,
wherein the second wireless base station is configured to use the frequency synchronisation signal to synchronise a frequency of the second clock with a frequency of the first clock.

20. A non-transitory, computer-readable medium storing computer-executable instructions that, when executed by a processor, configure a network node comprising the processor to perform operations corresponding to the method of claim 1.

* * * * *

UNITED STATES PATENT AND TRADEMARK OFFICE
CERTIFICATE OF CORRECTION

PATENT NO. : 10,575,271 B2
APPLICATION NO. : 16/281920
DATED : February 25, 2020
INVENTOR(S) : Ruffini et al.

Page 1 of 1

It is certified that error appears in the above-identified patent and that said Letters Patent is hereby corrected as shown below:

In the Specification

In Column 1, Line 9, delete "2018," and insert -- 2019, now Pat. No. 10,257,799, --, therefor.

In Column 1, Line 11, delete "PCT/SE2015/066418" and insert -- PCT/EP2015/066418 --, therefor.

In Column 3, Line 18, delete "messages" and insert -- messages. --, therefor.

In Column 9, Line 6, delete "main switch or cross-connect 31." and insert -- main switch or cross-connect 13. --, therefor.

In Column 12, Line 12, delete "transport network 21" and insert -- transport network 20 --, therefor.

In Column 12, Line 52, delete "transport network 21" and insert -- transport network 20 --, therefor.

In Column 13, Lines 21-22, delete "transport network 21" and insert -- transport network 20 --, therefor.

In Column 16, Lines 3-4, delete "interfaces 71, 72, 72." and insert -- interfaces 71, 72, 73. --, therefor.

Signed and Sealed this
Sixteenth Day of June, 2020

Andrei Iancu
*Director of the United States Patent and Trademark Office*